US008719624B2

(12) United States Patent
Machida

(10) Patent No.: US 8,719,624 B2
(45) Date of Patent: May 6, 2014

(54) REDUNDANT CONFIGURATION MANAGEMENT SYSTEM AND METHOD

(75) Inventor: Fumio Machida, Tokyo (JP)

(73) Assignee: NEC Corporation, Tokyo (JP)

( * ) Notice: Subject to any disclaimer, the term of this patent is extended or adjusted under 35 U.S.C. 154(b) by 289 days.

(21) Appl. No.: 12/747,955

(22) PCT Filed: Dec. 10, 2008

(86) PCT No.: PCT/JP2008/072436
§ 371 (c)(1),
(2), (4) Date: Jun. 14, 2010

(87) PCT Pub. No.: WO2009/081736
PCT Pub. Date: Jul. 2, 2009

(65) Prior Publication Data
US 2010/0293409 A1 Nov. 18, 2010

(30) Foreign Application Priority Data

Dec. 26, 2007 (JP) ................................ 2007-334441

(51) Int. Cl.
*G06F 11/07* (2006.01)
(52) U.S. Cl.
CPC ............ *G06F 11/0712* (2013.01); *G06F 11/07* (2013.01); *G06F 11/0703* (2013.01); *G06F 11/0706* (2013.01); *G06F 11/0709* (2013.01)
USPC .................................. 714/11; 714/1; 714/4.11
(58) Field of Classification Search
CPC . G06F 11/07; G06F 11/0703; G06F 11/0709; G06F 11/0706; G06F 11/0712
USPC .................................................. 714/4.11, 11
See application file for complete search history.

(56) References Cited

U.S. PATENT DOCUMENTS

| 5,805,790 | A | 9/1998 | Nota et al. | |
|---|---|---|---|---|
| 2003/0135609 | A1* | 7/2003 | Carlson et al. | 709/224 |
| 2003/0217088 | A1* | 11/2003 | Takamoto | 709/1 |
| 2004/0205414 | A1* | 10/2004 | Roselli et al. | 714/39 |
| 2005/0044301 | A1* | 2/2005 | Vasilevsky et al. | 711/1 |
| 2006/0085668 | A1* | 4/2006 | Garrett | 714/4 |
| 2006/0085785 | A1* | 4/2006 | Garrett | 718/1 |
| 2006/0143498 | A1 | 6/2006 | Hatasaki et al. | |

(Continued)

FOREIGN PATENT DOCUMENTS

| JP | 57-6945 A | 1/1982 |
|---|---|---|
| JP | H08263454 A | 10/1996 |

(Continued)

OTHER PUBLICATIONS

International Search Report for PCT/JP2008/072436 mailed Mar. 17, 2009.

(Continued)

*Primary Examiner* — Chae Ko
(74) *Attorney, Agent, or Firm* — Sughrue Mion, PLLC

(57) ABSTRACT

Upon receipt of an availability requirement of a computer system under management, a redundant configuration management system determines placement of processing programs in physical servers equipped in the computer system to satisfy the availability requirement with reference to system configuration information indicative of the configuration of the computer system and restriction information for limiting the number of processing programs which can be run by the physical servers.

15 Claims, 19 Drawing Sheets

(56) References Cited

U.S. PATENT DOCUMENTS

| | | |
|---|---|---|
| 2006/0184349 A1* | 8/2006 | Goud et al. .................. 703/24 |
| 2006/0212677 A1* | 9/2006 | Fossum .......................... 712/1 |
| 2008/0022151 A1* | 1/2008 | Stange et al. ................ 714/10 |
| 2008/0091837 A1* | 4/2008 | Langen et al. ............. 709/230 |
| 2008/0155168 A1* | 6/2008 | Sheu et al. .................... 711/6 |
| 2008/0189468 A1* | 8/2008 | Schmidt et al. ............... 711/6 |
| 2008/0215793 A1* | 9/2008 | Hashimoto et al. ........... 711/6 |
| 2009/0013029 A1* | 1/2009 | Childress et al. .......... 709/203 |
| 2009/0044265 A1* | 2/2009 | Ghosh et al. ................ 726/14 |
| 2009/0063893 A1* | 3/2009 | Bagepalli et al. ............. 714/4 |
| 2009/0138752 A1* | 5/2009 | Graham et al. ................ 714/4 |

FOREIGN PATENT DOCUMENTS

| | | |
|---|---|---|
| JP | 2002055840 A | 2/2002 |
| JP | 2003330740 A | 11/2003 |
| JP | 2004318578 A | 11/2004 |
| JP | 2005115653 A | 4/2005 |
| JP | 2005242404 A | 9/2005 |
| JP | 2006024214 A | 1/2006 |
| JP | 2006072772 A | 3/2006 |
| JP | 2006163963 A | 6/2006 |
| JP | 2006164080 A | 6/2006 |
| JP | 2007148839 A | 6/2007 |

OTHER PUBLICATIONS

P. Barham et al., "Xen and the Art f Virtualizat n", 19th ACM Symposium on Operating Systems Principles (SOS P19), Oct. 2003, pp. 1-14.

Japanese Office Action for JP2009-547024 mailed on Dec. 4, 2012.

* cited by examiner

Fig.9

[AVAILABILITY REQUIREMENTS]

MAXIMUM ALLOWABLE
SIMULATANEOUS FAULT:2
MINIMUM OPERATING LEVEL

| SUB-SYSTEM | MINIMUM OPERATING LEVEL |
|---|---|
| APPLICATION A | MINIMUM NUMBER OF SERVERS=1 |
| APPLICATION B | MINIMUM NUMBER OF SERVERS=1 |
| | |

Fig.10

[VIRTUAL SERVER RESTRICTION]

| PHYSICAL SERVER | NUMBER OF VIRTUAL SERVERS (ACTIVE) | NUMBER OF VIRTUAL SERVERS (REDUNDANT) |
|---|---|---|
| PHYSICAL SERVER1 | 1 | 1 |
| PHYSICAL SERVER2 | 1 | 1 |
| PHYSICAL SERVER3 | 1 | 1 |
| | | |

Fig.11

[VIRTUAL SERVER PLACEMENT INFORMATION]

| PHYSICAL SERVER | VIRTUAL SERVER |
|---|---|
| PHYSICAL SERVER1 | APPLICATION A (ACTIVE) |
| | APPLICATION B (REDUNDANT) |
| PHYSICAL SERVER2 | APPLICATION B (ACTIVE) |
| | APPLICATION C (REDUNDANT) |
| PHYSICAL SERVER3 | APPLICATION C (ACTIVE) |
| | APPLICATION A (REDUNDANT) |
| | |

[DEGENERATED CONFIGURATION INFORMATION]

| PHYSICAL SERVER | VIRTUAL SERVER | STATE | DEGENERACY PROCESS |
|---|---|---|---|
| PHYSICAL SERVER1 | APPLICATION A (ACTIVE) | FAILURE | |
| | APPLICATION B (REDUNDANT) | FAILURE | |
| PHYSICAL SERVER2 | APPLICATION B (ACTIVE) | | |
| | APPLICATION C (REDUNDANT) | | |
| PHYSICAL SERVER3 | APPLICATION C (ACTIVE) | | → APPLICATION C (REDUNDANT) |
| | APPLICATION A (REDUNDANT) | | → APPLICATION A (ACTIVE) |
| | | | |

APPLICATION A

| NUMBER OF ALLOWED CLIENTS | NUMBER OF SERVERS MINIMALLY REQUIRED |
|---|---|
| 20000 | 3 |
| 14000 | 2 |
| 7000 | 1 |

Fig.19

[AVAILABILITY REQUIREMENT]

MAXIMUM ALLOWABLE SIMULTANEOUS FAULT : 3

MINIMUM OPERATING LEVEL

| SUBSYSTEM | MINIMUM OPERATING LEVEL |
|---|---|
| APPLICATION A | MINIMUM NUMBER OF SERVERS=1 |
| APPLICATION B | MINIMUM NUMBER OF SERVERS=1 |
| APPLICATION C | MINIMUM NUMBER OF SERVERS=1 |

Fig.20

[VIRTUAL SERVER RESTRICTION]

| PHYSICAL SERVER | NUMBER OF VIRTUAL SERVERS (ACTIVE) | NUMBER OF VIRTUAL SERVERS (REDUNDANT) |
|---|---|---|
| PHYSICAL SERVER 1 | 1 | 1 |
| PHYSICAL SERVER 2 | 1 | 1 |
| PHYSICAL SERVER 3 | 1 | 1 |
| PHYSICAL SERVER 4 | 1 | 1 |
| PHYSICAL SERVER 5 | 1 | 1 |
| PHYSICAL SERVER 6 | 1 | 1 |

[SYSTEM CONFIGURATION INFORMATION]

NUMBER OF PHYSICAL SERVERS=6

NUMBER OF APPLICATIONS=3

ACTIVE SERVER ALLOCATION

| PHYSICAL SERVER | ACTIVE APPLICATION |
|---|---|
| PHYSICAL SERVER 1 | APPLICATION A |
| PHYSICAL SERVER 2 | APPLICATION A |
| PHYSICAL SERVER 3 | APPLICATION A |
| PHYSICAL SERVER 4 | APPLICATION B |
| PHYSICAL SERVER 5 | APPLICATION B |
| PHYSICAL SERVER 6 | APPLICATION C |

Fig.23

[NUMBER OF REQUIRED SERVER]

| APPLICATION | NUMBER OF ACTIVE SERVERS | NUMBER OF MINIMUM SERVERS | FAILURE MARGIN | NUMBER OF REQUIRED SERVERS |
|---|---|---|---|---|
| APPLICATION A | 3 | 1 | 2 | 1 |
| APPLICATION B | 2 | 1 | 1 | 2 |
| APPLICATION C | 1 | 1 | 0 | 3 |

Fig.26

[VIRTUAL SERVER PLACEMENT INFORMATION]

| PHYSICAL SERVER | APPLICATION (ACTIVE) | APPLICATION (REDUNDANT) |
|---|---|---|
| PHYSICAL SERVER 1 | APPLICATION A | APPLICATION B |
| PHYSICAL SERVER 2 | APPLICATION A | APPLICATION B |
| PHYSICAL SERVER 3 | APPLICATION A | APPLICATION C |
| PHYSICAL SERVER 4 | APPLICATION B | APPLICATION C |
| PHYSICAL SERVER 5 | APPLICATION B | APPLICATION C |
| PHYSICAL SERVER 6 | APPLICATION C | APPLICATION A |

Fig.27

[FAILURE INFORMATION]

FAILED SERVER={PHYSICAL SERVER2,
 PHYSICAL SERVER5,
 PHYSICAL SERVER6}

Fig.28

[GRACEFUL DEGRADATION INFORMATION]

| PHYSICAL SERVER | APPLICATION (ACTIVE) | | APPLICATION (REDUNDANT) | |
|---|---|---|---|---|
| | REDUNDANT CONFIGURATION | GRACEFUL DEGRADATION | REDUNDANT CONFIGURATION | GRACEFUL DEGRADATION |
| PHYSICAL SERVER 1 | APPLICATION A | | APPLICATION B | GRACEFUL DEGRADATION |
| PHYSICAL SERVER 2 | APPLICATION A | FAILURE | APPLICATION B | FAILURE |
| PHYSICAL SERVER 3 | APPLICATION B | APPLICATION C | APPLICATION C | APPLICATION A |
| PHYSICAL SERVER 4 | APPLICATION B | | APPLICATION C | |
| PHYSICAL SERVER 5 | APPLICATION B | FAILURE | APPLICATION C | FAILURE |
| PHYSICAL SERVER 6 | APPLICATION C | FAILURE | APPLICATION A | FAILURE |

REDUNDANT CONFIGURATION MANAGEMENT SYSTEM AND METHOD

This application is the National Phase of PCT/JP2008/072436, filed Dec 10, 2008, which claims priority under Japanese Patent Application No. 2007-334441 filed Dec. 26, 2007, the disclosure of which is incorporated herein by reference in its entirety.

TECHNICAL FIELD

The present invention relates to a redundant configuration management system and method for accomplishing redundancy for a computer system comprised of a plurality of physical servers using virtual machine technologies.

BACKGROUND ART

In computer systems which are required to stably operate at all times such as key systems in data centers and enterprises, reliability is improved by providing redundant servers. Such a computer system can stably provide services using remaining servers even if some of the servers fail, by operating redundant servers in addition to a minimally required number of servers.

Approaches in the background art for providing redundant servers include, for example, duplexing, (N+M) topology, and (N+1) configuration which are described in Patent Document 1 (Japanese Patent Laid-Open No. 2002-55840A). Duplexing refers to an approach to provide a redundant physical server for all servers. The (M+N) topology refers to an approach to provide M redundant physical servers for N servers, where an (N+1) topology particularly refers to the topology when M=1.

In the redundancy accomplishment approach described in Patent Document 1, since physical servers are provided for redundancy, the system cost is increased by such physical servers. Particularly, in a computer system which comprises a plurality of subsystems (application programs (hereinafter simply referred to as "applications") for providing services, a redundant physical server is required for each subsystem (application), causing an increase in cost for accomplishing redundancy. Accordingly, ideas are needed for reducing the cost, such as sharing a redundant physical serve among a plurality of subsystems (applications).

On the other hand, recent key systems in data centers and enterprises have increasingly employed some implementations for constructing a plurality of virtual servers on a physical server using virtual machine technologies.

For example, Non-Patent Document 1 (B. Dragovic, K. Fraser, S. Hand, T. Harris, A. Ho, I. Pratt, A. Warfield, P. Barpham and R. Neugebauer, Xen and the Art of Virtualization, 19th ACM. Symposium on Operating Systems Principles (SOS P19), 2003) presents technologies for utilizing computer resources (CPU, memory devices and the like) provided by a physical server as a plurality of virtual servers implemented by certain processing programs. Such virtual machine technologies, when utilized, can provide a redundant server for each subsystem (application) by additionally installing virtual servers, without introducing extra physical servers, and can therefore accomplish redundancy for a computer system at a lower cost.

As described above, the redundancy accomplishment approach described in Patent Document 1 requires a physical server for each subsystem (application) for redundancy, so that this approach implies a problem of increased cost for a computer system which comprises a plurality of subsystems (applications) when redundancy is attempted for such a computer system.

On the other hand, the redundancy accomplishment approach which utilizes virtual machine technologies can accomplish redundancy for a computer system at a lower cost. However, if a physical server fails, a plurality of virtual servers can tend to simultaneously fail, thus giving rise to a problem in which this approach fails to provide advantages (recovery, continuous operation and the like of the computer system) that should result from redundancy. For example, assuming that an active virtual server (active server) and a redundant virtual server (redundant server) are assigned to the same subsystem (application) and that they are installed on the same physical server, if the physical server fails, redundancy cannot be relied on to recover or continuously operate the computer system. Stated another way, in virtual machine technologies, an active server and a redundant server assigned to the same subsystem (application) must be installed on different physical servers.

While the virtual machine technologies of Non-Patent Document 1 can determine the number of redundant servers required for a computer system, it does not show how virtual servers are installed in relation to physical servers.

SUMMARY

Accordingly, it is an object of the present invention to provide a redundant configuration management system and method which are capable of accomplishing redundancy for a computer system by making use of virtual machine technologies, without failing to provide the advantages of redundancy, such as recovery and continuous operation of the computer system.

To achieve the above object, a redundant configuration management system according to an aspect of the present invention includes:

input means that is used to enter an availability requirement for a computer system under management; and redundant configuration design means that determines placement of processing programs in physical servers equipped in the computer system to satisfy the availability requirement with reference to system configuration information including information on the configuration of the computer system, and restriction information for limiting the number of processing programs that can be run on the physical servers.

A redundant configuration management method according to an aspect of the present invention, in turn, includes receiving an availability requirement for a computer system under management, and determining placement of processing programs in physical servers equipped in the computer system to satisfy the availability requirement with reference to system configuration information including information on the configuration of the computer system, and restriction information for limiting the number of processing programs that can be run on the physical servers.

BRIEF DESCRIPTION OF THE DRAWINGS

FIG. 1 is a block diagram showing the configuration of a redundant configuration management system according to an exemplary embodiment of the present invention.

FIG. 2 is a block diagram showing the configuration of a redundant configuration management system according to a first exemplary embodiment.

FIG. 3 is a block diagram showing the configuration of redundant configuration design means in the first exemplary embodiment.

FIG. 4 is a block diagram showing an exemplary configuration for implementing the redundant configuration management system shown in FIG. 1 and a redundant configuration management server shown in FIG. 2.

FIG. 5 is a flow chart showing a processing procedure for the redundant configuration design means in the first exemplary embodiment.

FIG. 6 is a flow chart showing a processing procedure during redundant configuration designing by virtual server management means and virtual server control means in the first exemplary embodiment.

FIG. 7 is a flow chart showing a processing procedure for graceful degradation determining means in the first exemplary embodiment.

FIG. 8 is a flow chart showing a processing procedure during graceful degradation designing by the virtual server management means and virtual server control means in the first exemplary embodiment.

[FIG.9]
FIG. 9 is a table showing exemplary availability requirements for use by the redundant configuration design means.

[FIG.10]
FIG. 10 is a table showing exemplary virtual server restriction information for use by the redundant configuration design means.

[FIG.11]
FIG. 11 is a table showing exemplary virtual server install information for use by the redundant configuration design means.

FIG. 12 is a table showing exemplary graceful degradation information for use by the redundant configuration design means.

FIG. 13 is a block diagram showing the configuration of redundant configuration design means according to a second exemplary embodiment.

FIG. 14 is a flow chart showing a processing procedure for the redundant configuration design means in the second exemplary embodiment.

FIG. 15 is a block diagram showing the configuration of redundant configuration design means according to a third exemplary embodiment.

FIG. 16 is a flow chart showing a processing procedure for the redundant configuration design means in the third exemplary embodiment.

FIG. 17 is a table showing exemplary conversion information for use by the redundant configuration design means.

FIG. 18 is a block diagram showing the configuration of an example of the redundant configuration management system.

[FIG.19]
FIG. 19 is a table showing exemplary availability requirements which are inputted into the redundant configuration management system shown in FIG. 18.

[FIG.20]
FIG. 20 is a table showing exemplary virtual server restriction information for use by the redundant configuration management system shown in FIG. 18.

FIG. 21 is a table showing exemplary system configuration information for use by the redundant configuration management system shown in FIG. 18.

FIG. 22 is a flow chart showing a procedure for calculating the number of required servers by redundant configuration design means shown in FIG. 18.

[FIG.23]
FIG. 23 is a table showing an example of failure margin and the number of required redundant servers, which are calculated in accordance with the processing procedure shown in FIG. 22.

FIG. 24 is a flow chart showing a procedure for installing virtual servers by the redundant configuration design means shown in FIG. 18.

FIG. 25 is a schematic diagram showing a process for determining a redundant configuration in accordance with the processing procedure shown in FIG. 24.

[FIG.26]
FIG. 26 is a table showing exemplary virtual server placement information derived in accordance with the processing procedure shown in FIG. 24.

[FIG.27]
FIG. 27 is a schematic diagram showing exemplary information on a failed physical server.

[FIG.28]
FIG. 28 is a table showing exemplary graceful degradation information output from graceful degradation determining means shown in FIG. 18.

EXEMPLARY EMBODIMENT

Figure 1:
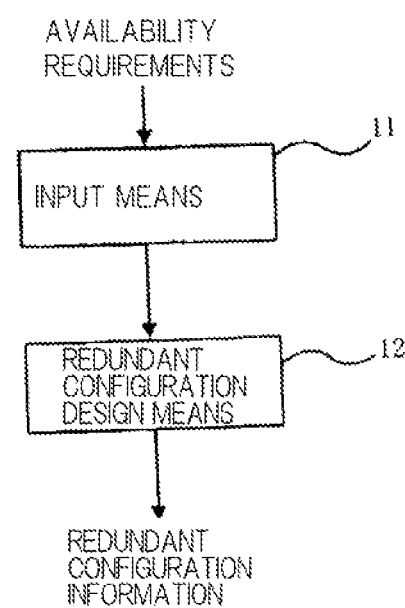
[FIG.1]
Figure 2:
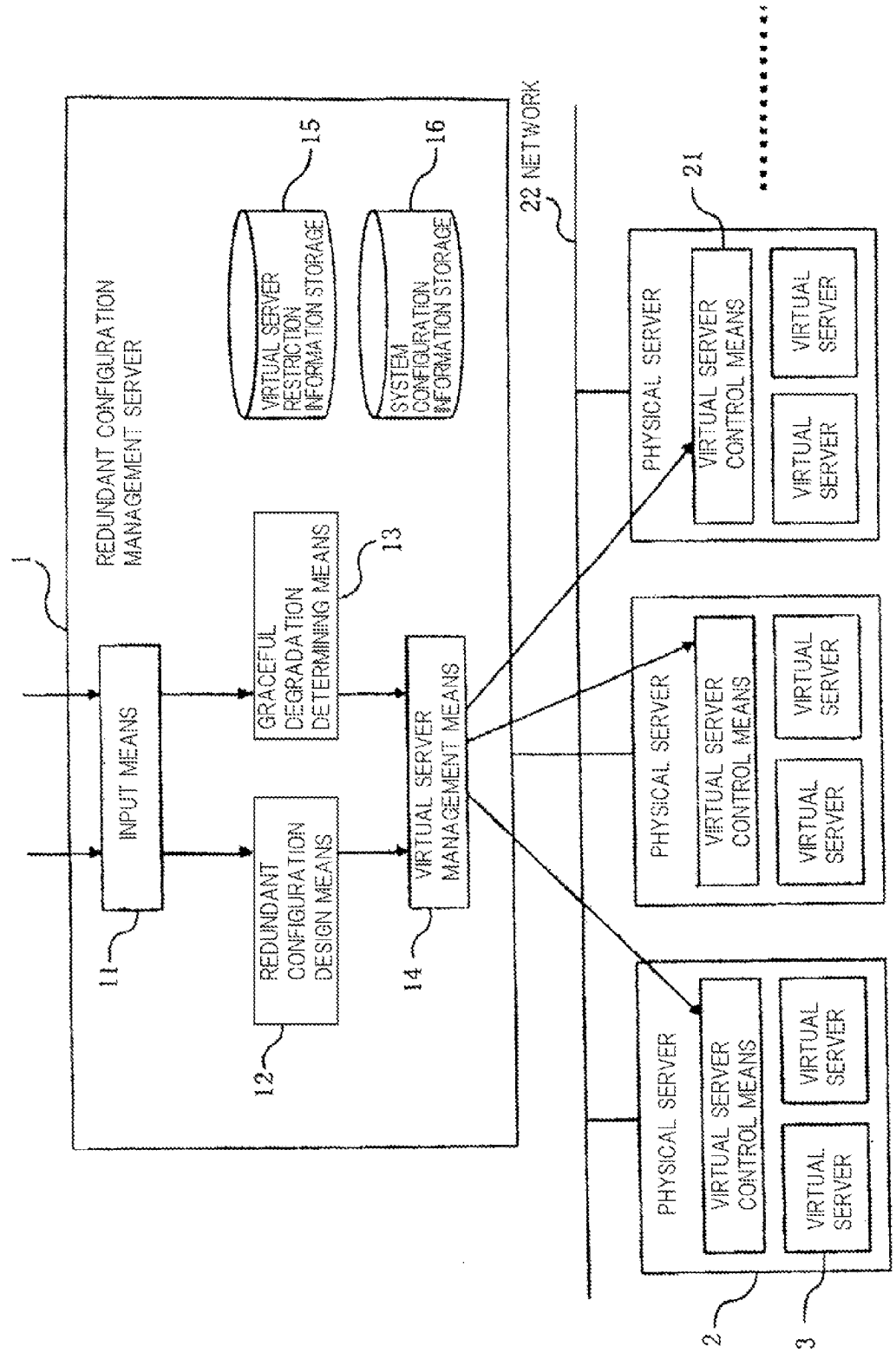
[FIG.2]
Figure 3:
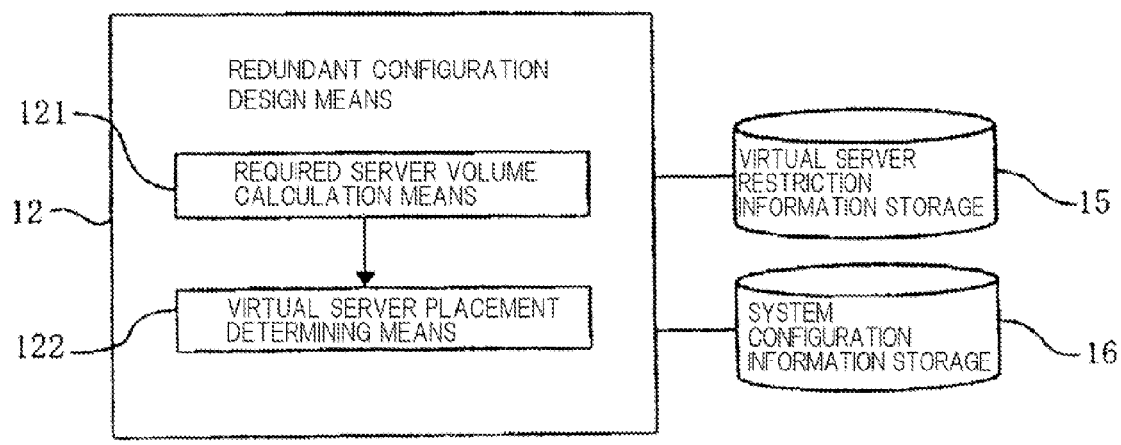
[FIG.3]

Next, the present invention will be described with reference to the drawings.
(First Exemplary Embodiment)
FIG. 1 is a block diagram showing the configuration of a redundant configuration management system according to an exemplary embodiment of the present invention. FIG. 2 is a block diagram showing the configuration of a redundant configuration management system according to a first exemplary embodiment, and FIG. 3 is a block diagram showing the configuration of redundant configuration design means in the first exemplary embodiment.

As shown in FIG. 1, the redundant configuration management system according to an exemplary embodiment of the present invention comprises input means 11, and redundant configuration design means 12.

The redundant configuration management system shown in FIG. 1 is intended to manage a redundancy configuration of a computer system which comprises a plurality of physical servers 2 and virtual servers 3 constructed on these physical servers 2, as shown in FIG. 2.

Input means 11 and redundant configuration design means 12 shown in FIG. 1 are implemented, for example, by redundant configuration management server 1 as shown in FIG. 2. Redundant configuration management server 1 is connected to a plurality of physical servers 2, which are to be managed by the redundant configuration management system, for example, through network 22.

Physical server 2 comprises virtual server control means 21, such that virtual server control means 21 controls zero or more virtual serves 3 constructed on physical server 2 itself.

Redundant configuration management server 1 shown in FIG. 2 comprises input means 11, redundancy configuration designing means 12, graceful degradation determining means 13, virtual server management means 14, virtual server restriction information storage 15, and system configuration information storage 16. While FIG. 2 shows an exemplary configuration in which virtual server control means 21 is provided in each physical server 2, virtual server control means 21 may alternatively be provided in redundant configuration management server 1.

As shown in FIG. 3, redundant configuration design means 21 in the first exemplary embodiment comprises required server volume calculation means 121, and virtual server placement determining means 122.

Input means 11 is used, for example, by an administrator who manages the computer system to enter availability requirements specified for the computer system. Input means 11 is also used by an administrator of a monitoring system, not shown, for monitoring physical servers 2 for the presence/absence of a failure, or of a computer system, to enter this information on failed physical server 2.

The availability requirements include information such as a maximum allowable simultaneous fault, indicative of the number of virtual servers 3 which can continuously operate the computer system, for example, even if a plurality of physical servers 2 simultaneously fail, or a minimum operating level indicative of a minimum number of virtual servers 3 which are required for services provided by each subsystem (application), and the like.

Redundant configuration design means 12 instructs required server volume calculation means 121 to calculate the numbers of physical servers 2 and virtual servers 3 required to accomplish redundancy for a computer system under management, with reference to the availability requirements entered through input means 11, system configuration information stored in system configuration information storage 16, and virtual server restriction information (restriction information) stored in virtual server restriction information storage 15.

The system configuration information is information indicative of the current configuration of a computer system, and includes information such as the number of physical servers 2 equipped in the computer system under management, the number of subsystems (applications), information on virtual servers installed on physical servers 2, presence/absence of a failure in physical servers 2, and the like. The virtual server restriction information (restriction information) is information for limiting the number of virtual servers 3 which can be operated on each physical server 2, and includes information such as the number of virtual servers which can be operated on physical servers 2 (active servers), and the number of redundant virtual servers (redundant servers).

Redundant configuration design means 12 also instructs virtual server placement determining means 122 to install virtual servers 3 on each physical server 2, and generates information indicative of the result (virtual server placement information). Virtual server placement determining means 122 installs a corresponding active server and redundant server on a physical server on a per subsystem basis. In this event, virtual server placement determining means 122 determines the placement of virtual servers 3 such that an active server and a redundant server assigned to the same subsystem (application) are not installed on the same physical server 2.

Virtual server management means 14 manages virtual servers 3 constructed on each physical server 2 based on the virtual server placement information generated from redundant configuration design means 12.

Virtual server control means 21 receives a variety of control requests from virtual server management means 14, and controls virtual servers 3 constructed within local physical server 2 in accordance with the control requests. The control requests made to virtual servers 3 include, for example, generation of virtual server 3, halt of the operation of virtual server 3, switching between an active server and a redundant server, and the like.

When physical server 2 fails after a redundant configuration has been constructed, information on this failed physical server 2 is entered from a human manager of the computer system or a monitoring system, not shown, which is monitoring physical server 2 for presence/absence of failure, through input means 11.

Graceful degradation determining means 13 determines a graceful degradation to satisfy the availability requirements, from information on failed physical server 2, which has been entered through input means 11, availability requirements, and system configuration information stored in system configuration information storage 16, and generates information indicative of the result (graceful degradation information). The graceful degradation refers to a redundant configuration which is constructed using remaining physical servers 2 except for failed physical server 2, and the graceful degradation information is information indicative of the graceful degradation.

Virtual server management means 14 changes the assignment of virtual servers 3 constructed on physical servers 2 using virtual server control means 21 based on the graceful degradation information generated from graceful degradation determining means 13.

Figure 4:
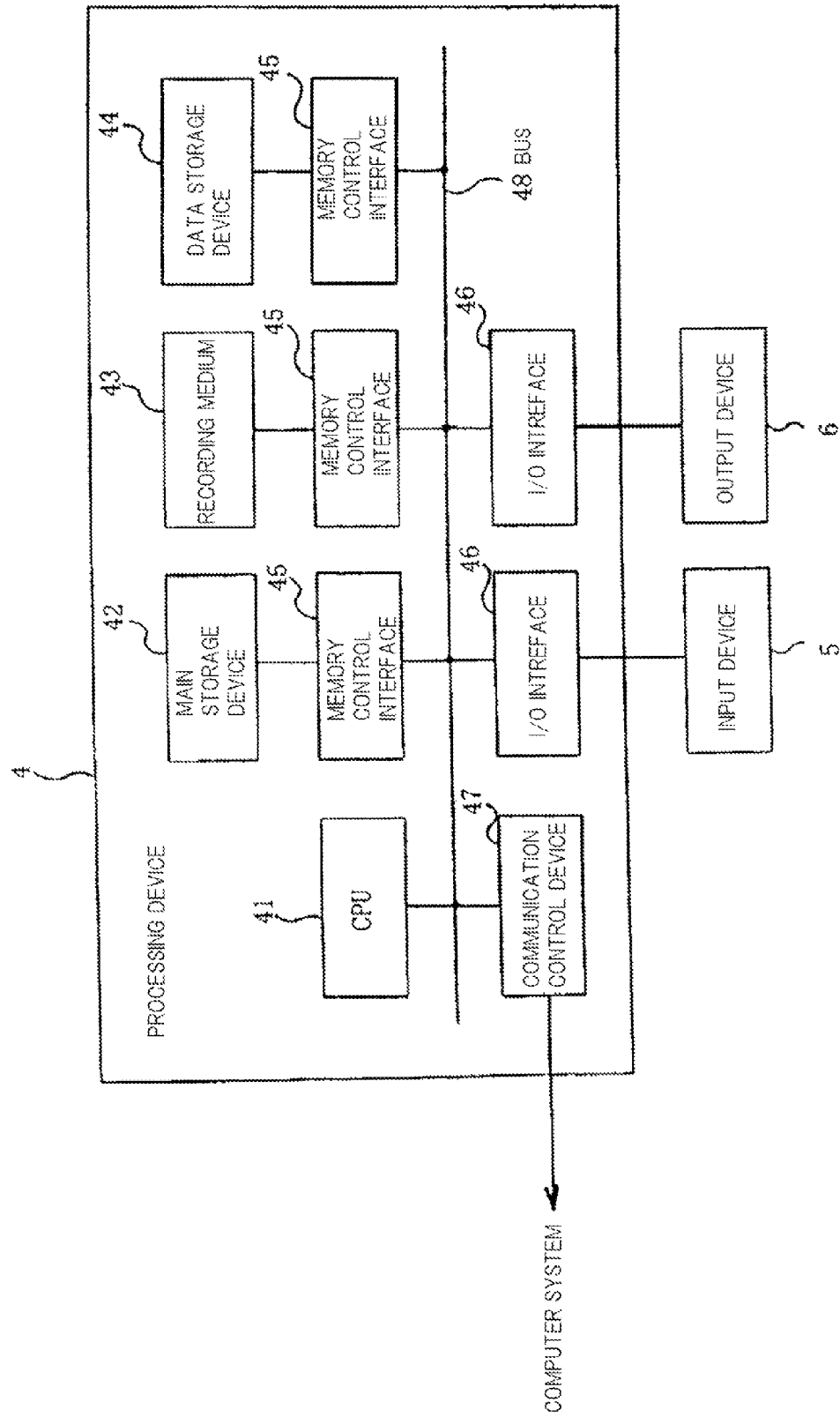
[FIG.4]

The redundant configuration management system shown in FIG. 1 and redundant configuration management server device 1 shown in FIG. 2 can be implemented, for example, by a computer shown in FIG. 4.

The computer shown in FIG. 4 comprises processing device 4 for executing predetermined processing in accordance with a program, input device 5 for entering commands, information and the like into processing device 4, and output device 6 for monitoring processing results of processing device 4.

Processing device 4 comprises CPU 41, main storage device 42 for temporarily storing information required for processing by CPU 41, recording medium 43 which has recorded thereon a program for causing CPU 41 to execute processing of the aforementioned redundant configuration design means 12, graceful degradation determining means 13, and virtual server management means 14, data storage device 44 for use as the aforementioned virtual server restriction information storage 15, system configuration information storage 16, and server volume conversion information storage 17, later described, memory control interface 45 for controlling data transfers among main storage device 42, recording medium 43, and data storage device 44, I/O interface 46 which is an interface device between input device 5 and output device 6, and communication control device 47 which is an interface for controlling communications with a plurality of physical servers 2 under management, where these components are all interconnected through bus 48.

Processing device 4 executes processing of redundant configuration design means 12, graceful degradation determining means 13, and virtual server management means 14 in accordance with a program recorded on recording medium 43. Specifically, recording medium 43 may be a magnetic disk, a semiconductor memory, an optical disk, or any other recording medium. Data storage device 44 in turn need not be incorporated in redundant configuration management server device 1, but may be an independent device. Physical server 2 shown in FIG. 2 can also be implemented by the computer shown in FIG. 4 except that a different program should be run. Accordingly, a description thereon is herein omitted.

Next, a method of designing a redundant configuration according to this exemplary embodiment will be described with reference to the drawings.

The designing of a redundant configuration refers to a process for determining placement of an active server and a redundant server, which are implemented by virtual servers 3 for executing processing of each subsystem (application), in a plurality of physical servers 2.

Figure 5:
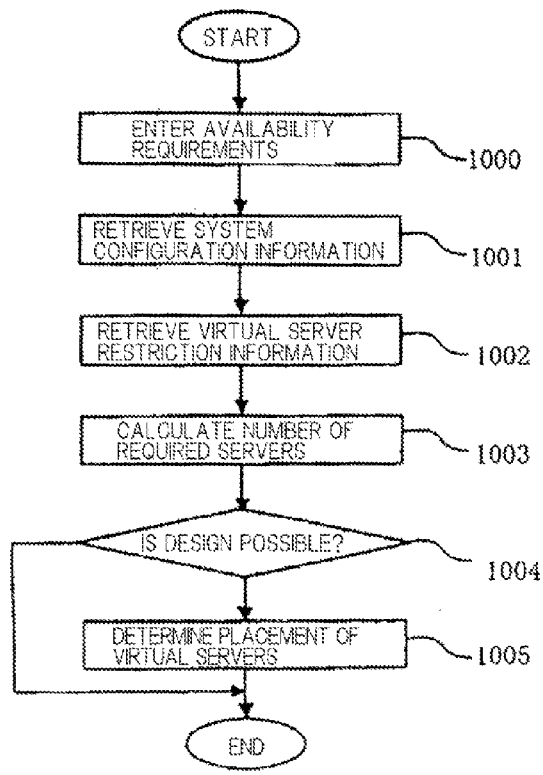
[FIG.5]
Figure 6:
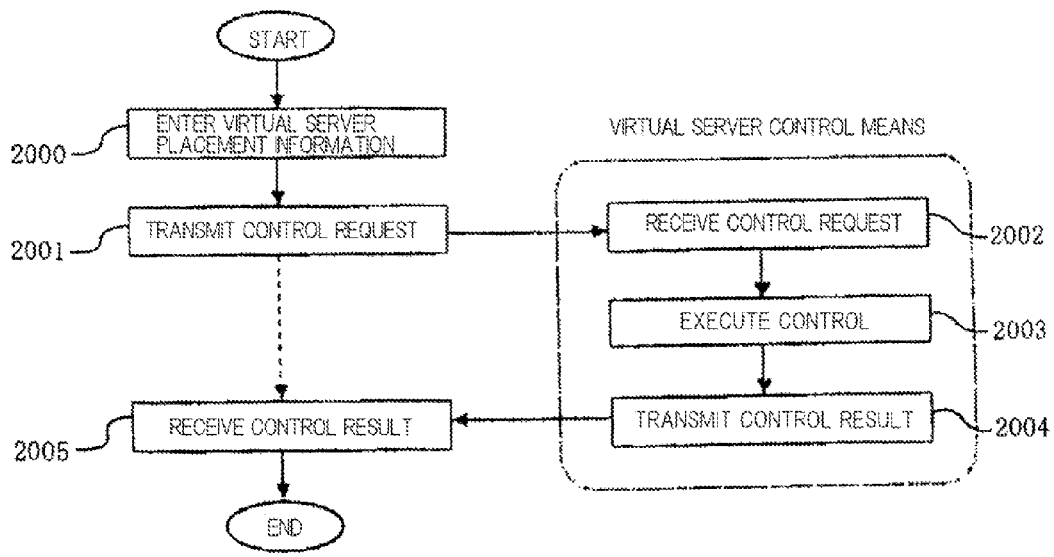
[FIG.6]

FIG. 5 is a flow chart showing a processing procedure for the redundant configuration design means in the first exemplary embodiment, and FIG. 6 is a flow chart showing a processing procedure during redundant configuration designing by the virtual server management means and virtual server control means in the first exemplary embodiment.

As shown in FIG. 5, as a human manager, for example, enters availability requirements using input means 11 (step 1000), redundant configuration design means 12 retrieves current system configuration information with reference to system configuration information storage 16 (step 1001).

The availability requirements refer to those requirements which indicate the level of reliability required for a computer system under management. FIG. 9 shows an example of the requirements. FIG. 9 shows an example of the maximum allowable simultaneous fault and a minimum operating level which are availability requirements.

The maximum allowable simultaneous fault refers to the number of failed physical servers 2 which can be allowed within the overall computer system, and serves as an indicator which indicates that the system can be continuously operated through a degradation process when the number of failed physical servers 2 is equal to or less than the maximum allowable simultaneous faults. The minimum operating level is a value which defines the minimum requirement needed to continuously operate the computer system, and the minimum number of virtual servers required for each subsystem (application), for example, is set to the minimum operating level. When a redundant configuration is designed utilizing virtual machine technologies, redundant servers must be provided against the occurrence of failure, such that these availability requirements are satisfied.

After retrieving the current system configuration information, redundant configuration design means 12 retrieves virtual server restriction information with reference to virtual server restriction information storage 15 (step 1002).

The virtual server restriction information is information indicative of restrictions specified for virtual servers 3 which can operate on each physical server 2. FIG. 10 shows an example of the virtual server restriction information. FIG. 10 shows an example of the number of virtual servers which can operate on each physical server 2.

As shown in FIG. 10, virtual servers 3 of this exemplary embodiment are classified into an active group and a redundant group. An active group refers to virtual servers which provide services for users (active servers), while a redundant group refers to virtual servers which are generally in a standby state and which are used when an active server fails (redundant servers). An active server is allocated sufficient computer resources in accordance with services provided for users, while a redundant server is allocated a minimum of computer resources required for the standby state. The amount of computer resources allocated to the virtual servers in the active group and virtual group can be controlled by a program which provides a known redundancy accomplishment function.

Redundant configuration design means 12 calculates the number of virtual servers 3 which satisfy the availability requirements with reference to a variety of retrieved information (step 1003). Redundant configuration design means 12 then examines whether or not the number of virtual servers 3 required for accomplishing redundancy for the computer system is equal to or less than the number of currently available virtual servers 3 to determine whether or not a redundant configuration can be designed (step 1004).

Redundant configuration design means 12, when determining that a redundant configuration can be designed, determines the placement of virtual servers 3 such that an active server and a redundant server assigned to the same subsystem (application) are not installed on the same physical server 2, and generates information indicative of the result (virtual server placement information (step 1005). Redundant configuration design means 12, when determining that a redundant configuration cannot be designed, generates, for example, the number of physical servers 2 which should be added for accomplishing redundancy, followed by termination of the processing.

When there is no problem in the virtual server placement information (redundant configuration) generated from redundant configuration design means 12, a process for constructing a redundant configuration is started by virtual server management means 14 and virtual server control means 21.

The construction of a redundant configuration may be started after a human manager confirms the virtual server placement information generated from virtual configuration designing means 12, or may be started without the confirmation of the human manager. In any case, the construction of a redundant configuration is started in response to the virtual server placement information entered into virtual server management means 14.

FIG. 11 shows exemplary virtual server placement information. FIG. 11 shows an example in which virtual servers 3 are defined to operate on each physical server 2. In the example shown in FIG. 11, two types of virtual servers 3, i.e., an active one and redundant one, operate on each physical server 2, where a subsystem (application) is assigned to each virtual server 3. Active virtual server 3 and redundant virtual server 3 that execute the same application are assigned to different physical servers 2.

As shown in FIG. 6, upon receipt of virtual server placement information (step 2000), virtual server management means 14 transmits a control request to virtual server control means 21 on each physical server 2 based on the virtual server placement information (step 2001).

As previously described, the control request includes generation of virtual server 3, halt of operation, change from an active server to a redundant server, a change from a redundant server to an active server, and the like.

Upon receipt of a control request for virtual server 3 (step 2002), virtual server control means 21 executes a requested control (step 2003), and transmits the result of the control to virtual server management means 1 4 (step 2004).

Virtual server management means 14 terminates a process for constructing a redundant configuration at the time it has received control results from all virtual server control means 21 equipped in respective physical servers 2 (step 2005).

Figure 7:
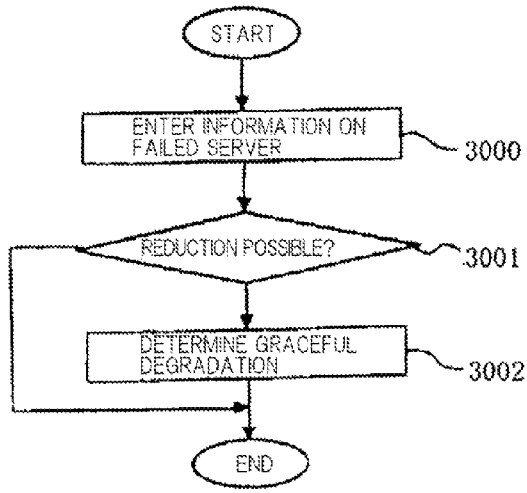
[FIG.7]
Figure 8:
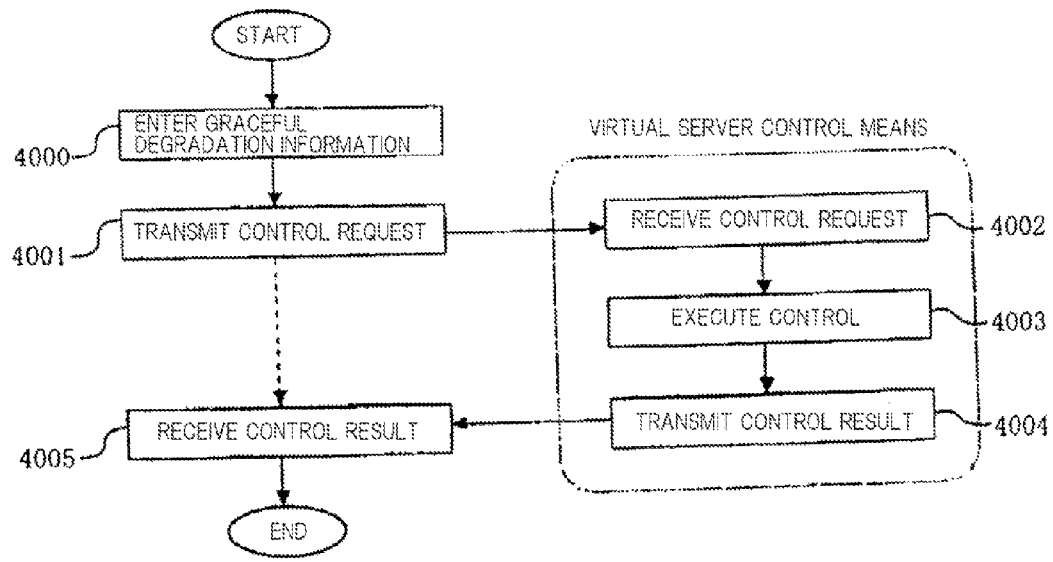
[FIG.8]

Referring next to FIGS. 7 and 8, a description will be given of the degradation process which is executed when physical server 2 fails.

FIG. 7 is a flow chart showing a processing procedure for the graceful degradation determining means in the first exemplary embodiment, and FIG. 8 is a flow chart showing a processing procedure during graceful degradation designing by the virtual server management means and virtual server control means in the first exemplary embodiment.

As shown in FIG. 7, as a physical server fails, graceful degradation determining means 13 receives information on failed physical server 2 through input means 11 (step 3000). The degradation process involves designing a redundant configuration (graceful degradation) that satisfies a minimum operating level, which is an availability requirement, with physical servers 2 except for failed physical server 2.

Graceful degradation determining means 13 compares the number of failed physical servers 2 with the maximum allowable simultaneous fault, which is an availability requirement, to determine whether or not the degradation process is available (step 3001). If the number of failed physical servers 2 exceeds the maximum allowable simultaneous fault, the degradation process cannot be executed, so that graceful degradation determining means 13 generates a message which indicates that the degradation process cannot be executed, followed by termination of the process.

On the other hand, when the number of failed physical servers 2 does not exceed the maximum allowable simultaneous fault, the degradation process can be executed, so that graceful degradation determining means 13 determines a graceful degradation which satisfies the availability requirements for remaining physical servers 2, except for failed physical server 2, and generates the result (graceful degradation information (step 3002).

Figures 12, 13:
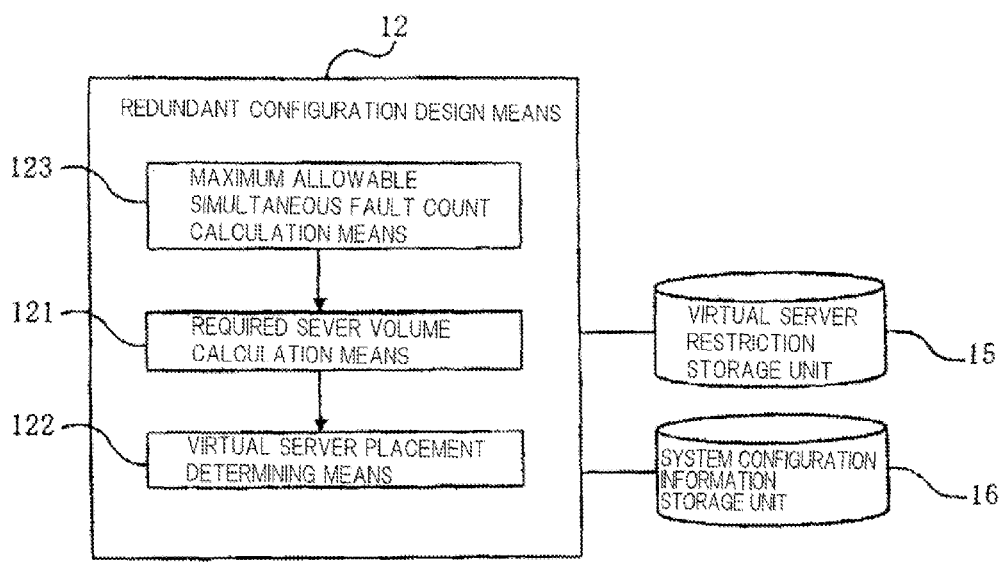
[FIG.12]
[FIG.13]

FIG. 12 shows exemplary graceful degradation information. FIG. 12 shows an exemplary degradation process triggered by a failure that occurs in a first physical server (physical server 1) to switch a virtual server assigned to an application A installed on a third physical server (physical server 3) from a redundant server to an active server and to switch a virtual server assigned to application C from an active server to a redundant server.

The graceful degradation information generated from graceful degradation determining means 13 is applied to virtual server management means 14 which then starts the degradation process. In this event, the degradation process may be started after a human manager has approved it or it may be started without receiving the approval from the human manager.

As shown in FIG. 8, upon receipt of the graceful degradation information (step 4000), virtual server management means 14 transmits a control request to virtual server control means 21 based on the graceful degradation information (step 4001).

Upon receipt of the control request (step 4002), virtual server control means 21 executes a requested control (step 4003), and transmits the result of the control to virtual server management means 14 (step 4004). Virtual server management means 14 terminates the degradation process at the time it receives control results from all virtual server control means 21 equipped in respective physical servers 2 (step 4005).

According to the first exemplary embodiment, since redundant configuration design means 12 determines, with reference to the virtual server restriction information, the placement of virtual servers 3 such that an active server and a redundant server assigned to the same subsystem (application) are not installed on the same physical server 2, the virtual machine technologies can be utilized to accomplish redundancy for a computer system which can demonstrate advantages of redundancy, such as recovery, continuous operation and the like of the computer system.

Also, a redundant configuration is determined to satisfy availability requirements entered by a human manager, and a graceful degradation is determined to satisfy the availability requirements when physical server 2 fails, thus making it possible to apply the virtual machine technologies to design a redundant configuration which satisfies required availability requirements.

Further, since an active virtual server can be switched to a redundant virtual server and vice versa simply by changing the amount of computer resources allocated to virtual servers 3, the degradation process can be executed at high speeds without halting a computer system.

(Second Exemplary Embodiment)

A second exemplary embodiment differs from the redundant configuration management system of the first exemplary embodiment in that redundant configuration design means 12 is equipped with maximum allowable simultaneous fault count calculation means. Since the rest of the configuration is similar to that of the first exemplary embodiment, a description thereon is omitted.

FIG. 13 is a block diagram showing the configuration of the redundant configuration design means according to the second exemplary embodiment.

As shown in FIG. 13, redundant configuration design means 12 of the second exemplary embodiment comprises maximum allowable simultaneous fault count calculation means 123, required server volume calculation means 121, and virtual server placement determining means 122.

In the second exemplary embodiment, a human manager enters only information on a minimum operating level as an availability requirement through input means 11. The maximum possible number of simultaneous failures is calculated by maximum allowable simultaneous fault count calculation means 123 in accordance with the configuration of a computer system, and therefore need not be entered as an availability requirement.

Maximum allowable simultaneous fault count calculation means 123 references the entered minimum operating level, system configuration information stored in system configuration information storage 16, and virtual server restriction information stored in virtual server restriction information storage 15 to calculate the number of virtual servers 3 which can be continuously operated by the computer system through a degradation process even if a plurality of physical servers 2 simultaneously fail (maximum allowable simultaneous fault).

Required server volume calculation means 121 calculates the numbers of physical servers 2 and virtual servers 3 which satisfy the availability requirement, based on the maximum allowable simultaneous fault calculated by maximum allowable simultaneous fault count calculation means 123.

Virtual server placement determining means 122 references virtual server restriction information stored in virtual server restriction information storage 15, determines the placement of virtual servers 3 for each physical server 3 so as to satisfy the availability requirement, and generates the result (virtual server placement information).

Figure 14:
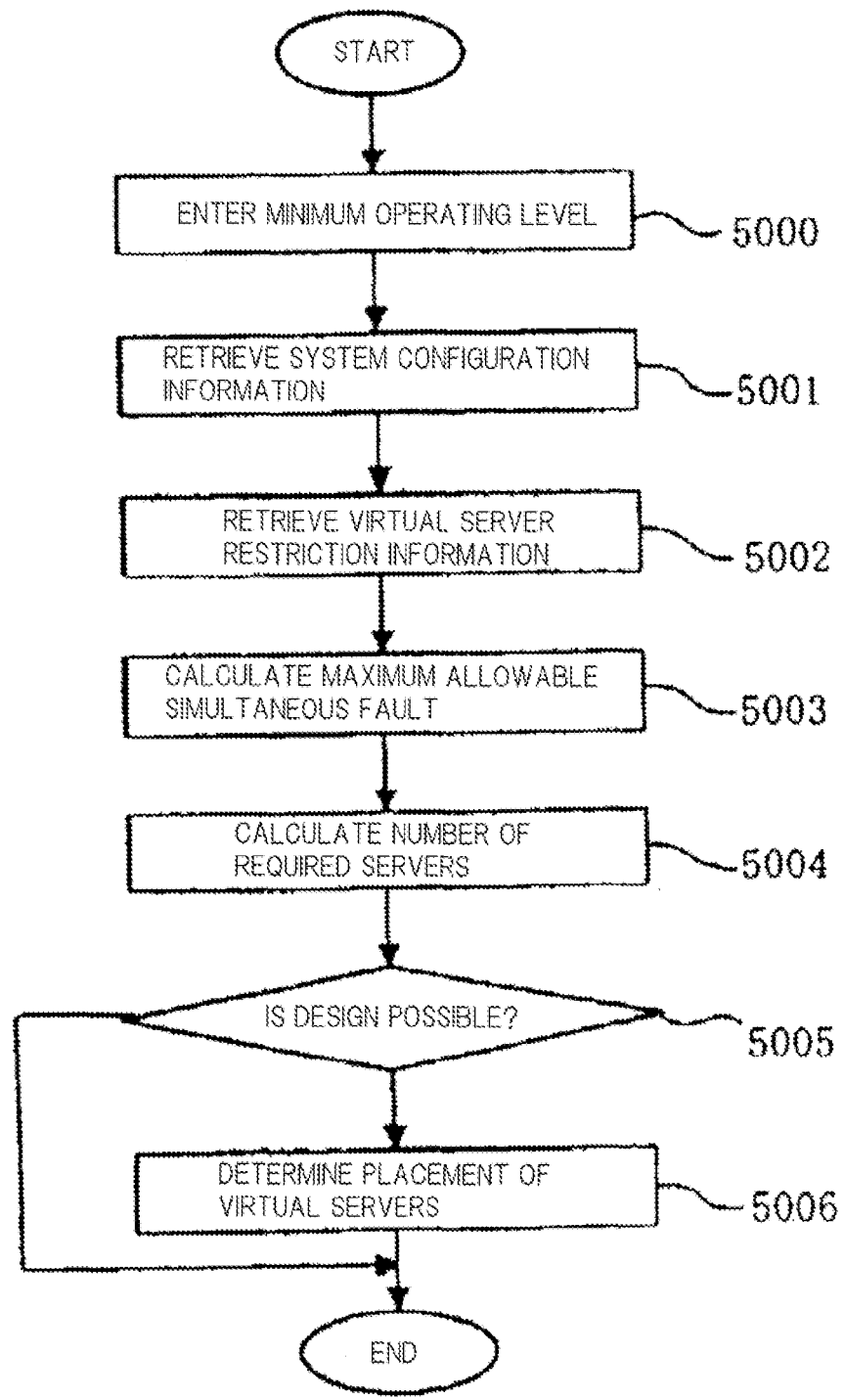
[FIG.14]

FIG. 14 is a flow chart showing a processing procedure for the redundant configuration design means in the second exemplary embodiment.

As shown in FIG. 14, as a human manager enters information on the minimum operating level using input means 11 (step 5000), redundant configuration design means 12 retrieves current system configuration information with reference to system configuration information storage 16 (step 5001).

Upon retrieval of the current system configuration information, redundant configuration design means 12 retrieves virtual server restriction information with reference to virtual server restriction information storage 15 (step 5002), and instructs maximum allowable simultaneous fault count calculation means 123 to calculate a maximum allowable simultaneous fault (step 5003). In this event, since the number of redundant virtual servers 3 available for assignment is limited by the virtual server restriction information, the maximum allowable simultaneous fault is also limited.

Redundant configuration design means 12 calculates the number of virtual servers 3 required for accomplishing redundancy, based on the calculated maximum allowable simultaneous fault (step 5004), determines the placement of virtual servers 3 for physical servers 2 based on the virtual server restriction information, and generates information indicative of the result (virtual server placement information) (step 5005).

Now, a description will be given of a method of calculating the maximum allowable simultaneous fault.

First, the number of failed physical servers 2 is defined by k, and the number of remaining active virtual servers 3 is defined by $R\_k$. Also, since the value of $R\_k$ differs depending on which physical server 2 has failed, a maximum value of $R\_k$ is defined by Max $R\_k$.

In this event, for satisfying the minimum operating level which is the availability requirement specified by the human manager, the value of $R\_k$ must be equal to or more than the number M of virtual servers 3 which satisfy the minimum operating level. Specifically, Max $R\_k \geq M$ must be satisfied.

Since Max $R\_k$ presents a value which monotonously increases in accordance with the value of k, a candidate for the maximum allowable simultaneous fault can be found by calculating a maximum value of k which satisfies this condition.

A procedure for constructing a redundant configuration based on the virtual server placement information is similar to the processing procedure of the first exemplary embodiment shown in FIG. 6. Also, the degradation process performed when a failure occurs is similar to that of the first exemplary embodiment shown in FIG. 7. Accordingly, a description thereof is herein omitted.

According to the redundant configuration management system of the second exemplary embodiment, since the human manager is not required to enter the maximum allowable simultaneous fault, the human manger is burdened with a smaller load, in addition to similar advantages to those of the first exemplary embodiment. Also, since the maximum allowable simultaneous fault is calculated on the basis of the minimum operating level, which is an availability requirement, system configuration information, and virtual server restriction information, it is possible to design a redundant configuration which provides the highest fault-tolerance capabilities (possible number of simultaneous failures) under given conditions.

(Third Exemplary Embodiment)

A third exemplary embodiment differs from the redundant configuration management systems of the first exemplary embodiment and second exemplary embodiment in that redundant configuration design means 12 is equipped with minimum server volume calculation means. Also, in the third exemplary embodiment, redundant configuration management server 1 is equipped with server volume conversion information storage 17. Since the remaining configuration is similar to that of the first exemplary embodiment, a description thereon is omitted.

Figure 15:
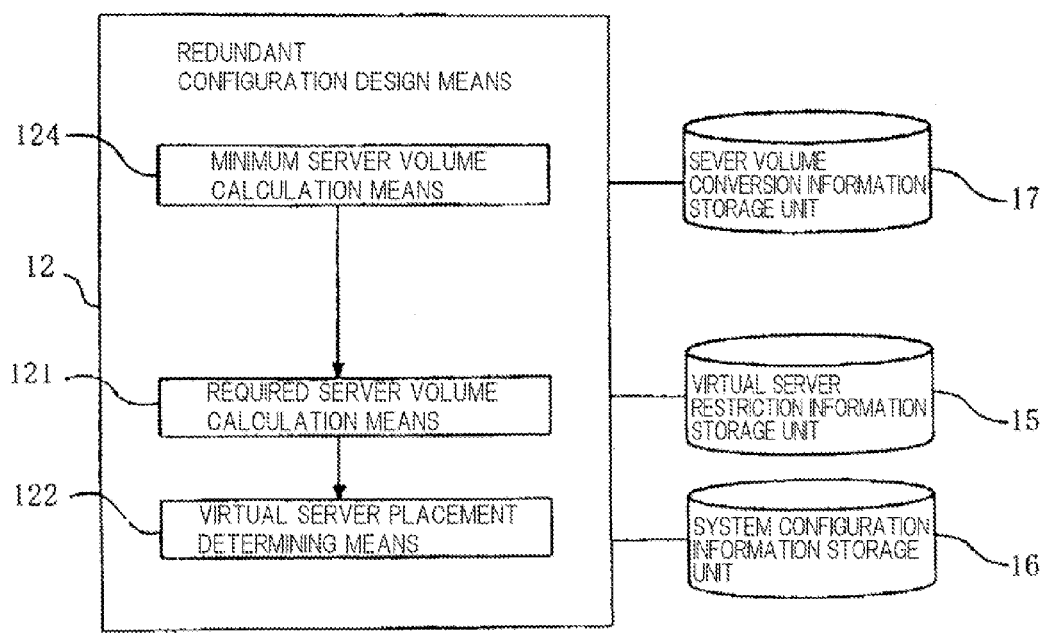
[FIG.15]

FIG. 15 is a block diagram showing the configuration of the redundant configuration design means according to the third exemplary embodiment.

As shown in FIG. 15, redundant configuration design means 12 of the third exemplary embodiment comprises minimum server volume calculation means 124, required server volume calculation means 121, and virtual server placement determining means 122.

In the third exemplary embodiment, a human manager enters, as availability requirements, a maximum allowable simultaneous fault, a service level, and business requirements.

Figures 16, 17:
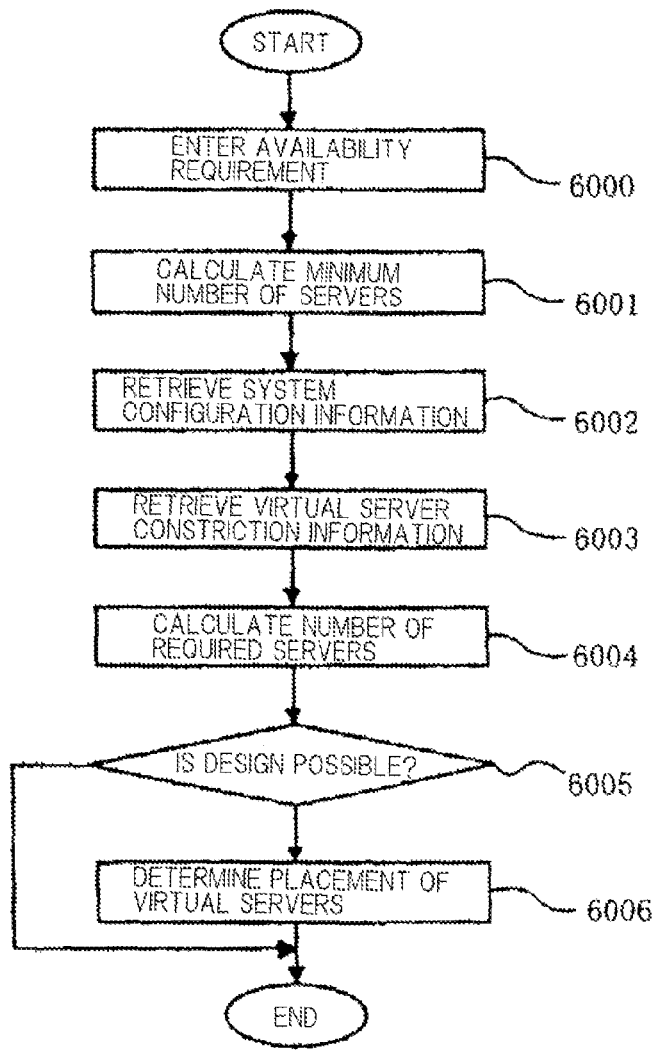
[FIG.16]
[FIG.17]

Minimum server volume calculation means 124 calculates a minimum number of virtual servers which satisfy availability requirements for each subsystem (application) based on the availability requirements entered through input means 11. In this event, minimum server volume calculation means 124 converts the entered service level and business requirements to a minimum number of virtual servers required for the service level and business requirements, with reference to conversion information stored in server volume conversion information storage 17. FIG. 17 shows exemplary conversion information stored in server volume conversion information storage 17. FIG. 17 shows an exemplary relationship among the number of allowed clients and the number of virtual servers minimally required to support the number of allowed clients in regard to application A. By referring to the table shown in FIG. 17, minimum server volume calculation means 124 can calculate the minimum number of virtual servers which satisfy the availability requirements even if the number of allowed clients is specified by a human manager or by a user as an available requirement.

Required server volume calculation means 121 calculates the number of virtual servers 3 required for accomplishing redundancy which satisfies the availability requirements, based on the maximum allowable simultaneous fault entered as the availability requirement.

Virtual server placement determining means 122 determines the placement of virtual servers 3 for each physical server 2 with reference to virtual server restriction information stored in virtual server restriction information storage 15, and generates the result (virtual server placement information).

FIG. 16 is a flow chart showing a processing procedure for the redundant configuration design means in the third exemplary embodiment.

As shown in FIG. 16, as a human manager enters the availability requirements using input means 11 (step 6000), redundant configuration design means 12 instructs minimum server volume calculation means 124 to calculate the number of virtual servers 3 required in support of the service level and business requirements with reference to information stored in server volume conversion information storage 17 (step 6001).

Subsequent processing is similar to that of the first exemplary embodiment shown at steps 1001-1005 in FIG. 5. In other words, steps 6002-6006 shown in FIG. 16 correspond to steps 1001-1005 shown in FIG. 5.

Also, a procedure for constructing a redundant configuration is similar to the processing procedure in the first exemplary embodiment shown in FIG. 6. Further, the degradation process performed when a failure occurs is similar to that of the first exemplary embodiment shown in FIG. 7. Accordingly, a description thereon is herein omitted.

According to the redundant configuration management system of the third exemplary embodiment, since availability requirements entered as a service level and business requirements are converted to a minimum number of virtual servers to determine a redundant configuration, a service level and business requirements requested by a human manager or by a user of a computer system, who does not understand the configuration of the system in detail, can be converted to a minimum number of virtual servers, which can be reflected to the redundant configuration, in addition to similar advantages to those of the first exemplary embodiment.

Additionally, redundant configuration design means 12 of the third exemplary embodiment may be equipped with maximum allowable simultaneous fault count calculation means 123 which has been shown in the second exemplary embodiment. In this event, the third exemplary embodiment can provide similar advantages to those of the redundant configuration management system of the second exemplary embodiment in addition to the foregoing advantages.

EXAMPLES

Next, the present invention will be described in regard to examples with reference to the drawings.

Figure 18:
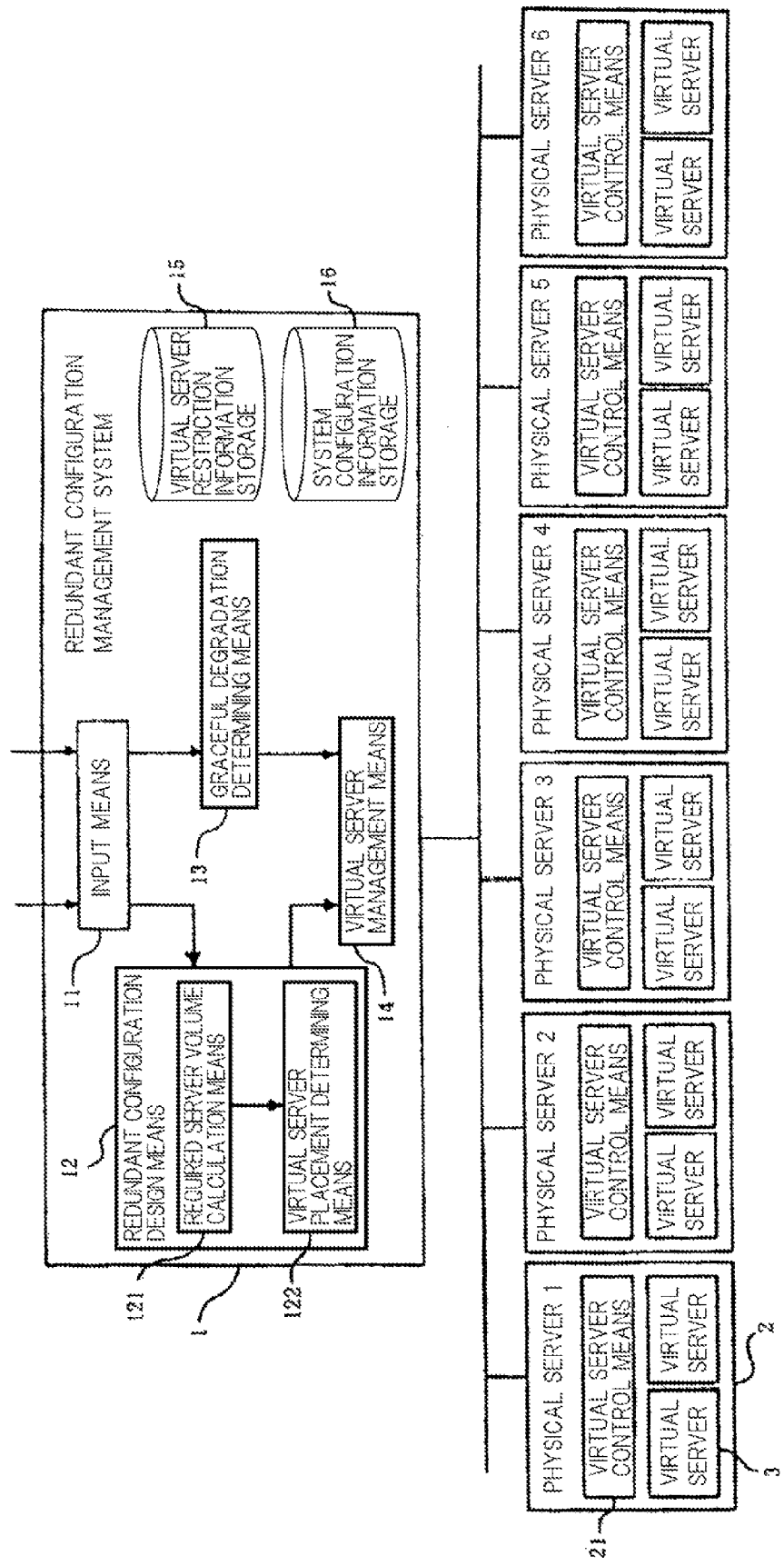
[FIG.18]

FIG. 18 is a block diagram showing the configuration of an example of a redundant configuration management system.

The redundant configuration management system shown in FIG. 18 comprises six physical servers 2 under management, and is configured such that two virtual servers can be operated on each of physical servers 2.

FIG. 20 is a table showing exemplary virtual server restriction information for use by the redundant configuration management system shown in FIG. 18.

As shown in FIG. 20, the redundant configuration management system of this example is limited by a restriction condition which dictates that one active virtual server and one redundant virtual server can each be assigned to each physical server.

Figures 21, 22:
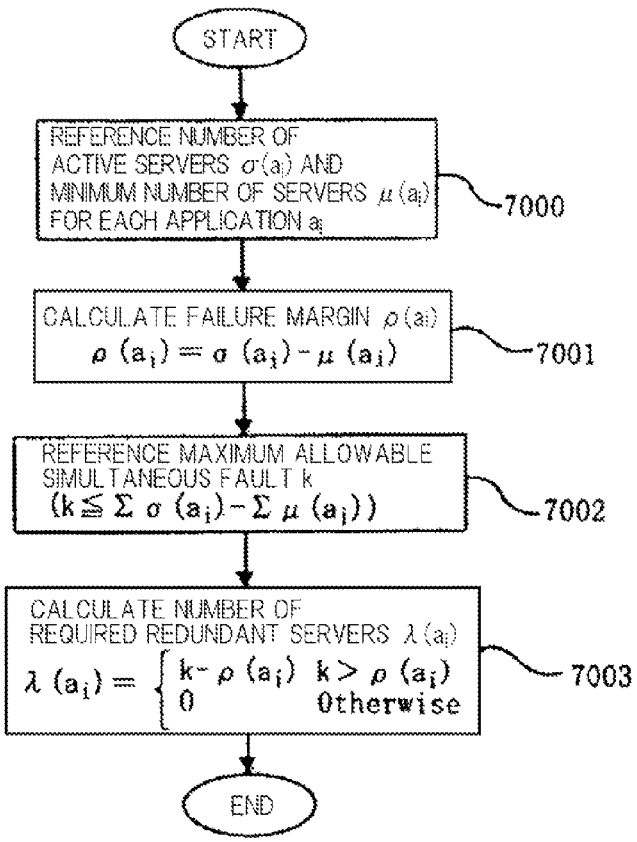
[FIG.21]
[FIG.22]

FIG. 21 is a table showing exemplary system configuration information for use by the redundant configuration management system shown in FIG. 18.

As shown in FIG. 21, assume that a redundant configuration management system of this example comprises six physical servers 2, and three subsystems (applications), where active virtual server 3 is assigned to each physical server 2. Here, the placement of redundant virtual servers 3 is determined to satisfy availability requirements entered by a human manager.

Assume that the availability requirements shown in FIG. 19 are entered into the redundant configuration management system shown in FIG. 18 through input means 11. Specifically, the maximum allowable simultaneous fault is equal to three, and the minimum operating level is such that at least one virtual server 3 remains active in support of each application.

Referring to the flow chart of FIG. 5, a description will be given of a procedure for redundant configuration design means 12 shown in FIG. 18 to determine the placement of redundant virtual servers (redundant servers).

As shown in FIG. 5, redundant configuration design means 12, upon receipt of availability requirements (step 1000), retrieves system configuration information from system configuration information storage 16 (step 1001), and retrieves virtual server restriction information from virtual server restriction information storage 15 (step 1002).

Redundant configuration design means 12 calculates, on a per-application basis, the number of virtual servers 3 required for accomplishing redundancy which satisfies the availability requirements, based on the foregoing information (step 1003).

FIG. 22 is a flow chart showing a procedure for the redundant configuration design means shown in FIG. 18 to calculate the number of required servers.

As shown in FIG. 22, redundant configuration design means 12 calculates the number $\sigma(a\_i)$ of active virtual servers corresponding to each application $a\_i$ based on the system configuration information, and calculates a minimum number $\mu(a\_i)$ of virtual servers based on the availability requirements (step 7000).

Next, redundant configuration design means 12 calculates the difference between $\sigma(a\_i)$ and $\mu(a\_i)$ to derive failure margin $\rho(a\_i)$ indicative of the failure tolerance at a current time (step 7001).

Next, redundant configuration design means 12 references the maximum allowable simultaneous fault, which is an availability requirement (step 7002). When the maximum allowable simultaneous fault is not specified as an availability requirement, redundant configuration design means 12 calculates a limit value indicative of the number of available redundant servers.

Finally, redundant configuration design means 12 calculates the difference between k corresponding to each application and $\rho(a\_i)$ to find the number of required redundant servers.

When $\rho(a\_i)$ is equal to or more than k, redundant configuration design means 12 set $\lambda(a\_i)=0$ (step 7003) because redundancy can be maintained for application a_i without adding extra virtual servers (step 7003).

FIG. 23 shows an example of the failure margin and the number of required virtual servers which have been found in accordance with the processing procedure shown in FIG. 22, given the computer system shown in FIG. 18 as an example.

Here, $\Sigma\lambda(a\_i)=6$ indicates the number of redundant servers required in the overall system. $\Sigma\lambda(a\_i)$ should not exceed the number of virtual servers which has been dictated by the configuration of the computer system under management or specified by the virtual server restriction information.

When the number of available redundant servers is equal to or more than $\Sigma\lambda(a\_i)$, a redundant configuration can be designed, whereas when the number of available redundant servers is less than $\Sigma\lambda(a\_i)$, no redundant configuration can be designed to satisfy the availability requirements (step 1004 in FIG. 5).

Redundant configuration design means 21 determines the placement of virtual servers 3 based on the virtual server restriction information (step 1005) when it determines that a redundant configuration can be designed.

Figure 24:
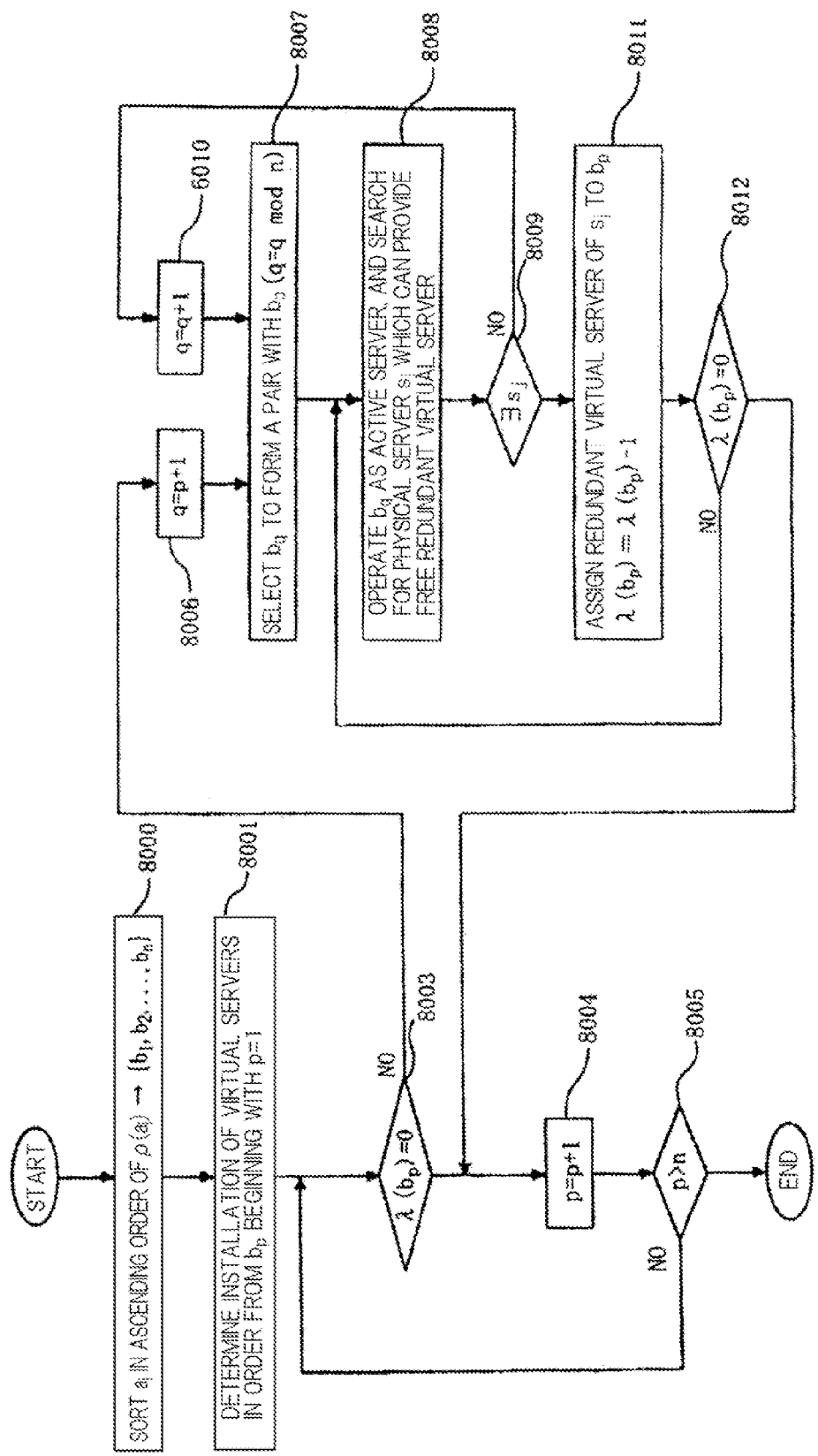
[FIG.24]

Referring to FIG. 24, a description will be given of a procedure for determining the placement of virtual servers.

As shown in FIG. 24, redundant configuration design means 12 first sorts applications $a\_i$ in an ascending order of $\rho(a\_i)$, and holds each of sorted applications as $\{b\_1, b\_2, \ldots, b\_n\}$ (step 8000). Subsequently, redundant configuration design means 12 determines the placement of virtual servers 3 in order from application b_p, beginning with p=1 (step 8001).

Next, redundant configuration design means 12 determines whether or not $\lambda(b\_p)=0$ to see whether or not virtual servers are required (step 8003).

When λ(b_p)=0, p is incremented by one (step 8004), followed by transition to the evaluation of the next application. When p>n, i.e., when the evaluation has been completed for all applications b_p, the procedure is terminated (step 8005).

When λ(b_p)>0, i.e., when redundant servers are required, q=p+1 is calculated (step 8006), and application b_q is selected to form a pair with application b_p (step 8007). In this event, different applications are selected to form a pair such that an active and a redundant virtual server for the same application are not assigned to the same physical server 2.

Redundant configuration design means 12 assigns an active server to application b_q which has been selected for the pair, and searches for physical server s_j which can provide a free redundant server (step 8008). When there is physical server s_j which can provide a free redundant server, redundant configuration design means 12 assigns application b_p to the redundant server of physical server s_j. In this event, redundant configuration design means 12 decrements the value of λ(b_p) (step 8011).

When there is no physical server s_j which can provide a free redundant server, redundant configuration design means 12 increments q to select a new pair, and returns to processing at step 8008 to repeat processing from there through step 8012.

When λ(b_p) becomes 0 in the processing at step 8011, redundant configuration design means 12 terminates the process for assigning a redundant server to application b_p.

Figure 25:
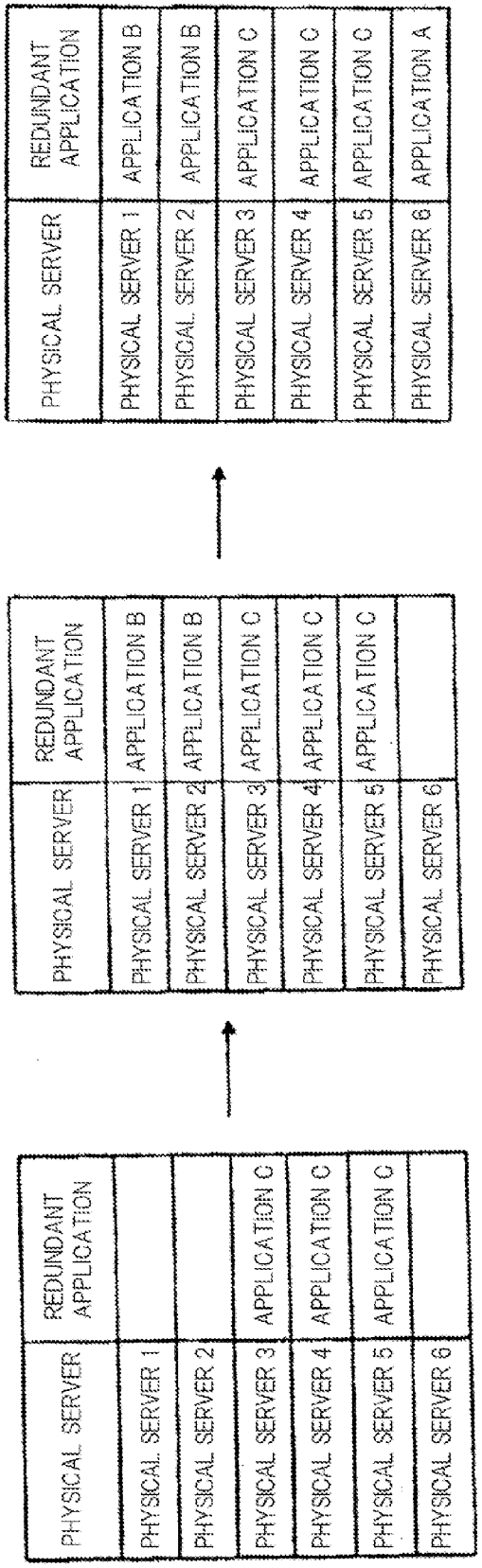
[FIG.25]

FIG. 25 schematically shows a process for determining a redundant configuration in accordance with the processing procedure shown in FIG. 24.

Redundant configuration design means 12 first sorts respective applications in an ascending order of failure margin. In the example shown in FIG. 25, the sorting results in an array of {Application C, Application B, Application A}.

In this event, redundant configuration design means 12 first selects application C, and selects application B to form a pair with application C. Redundant configuration design means 12 assigns virtual servers for application C to a fourth physical server (physical server 4) and a fifth physical server (physical server 5), respectively, to which active servers have been assigned for application B. Since λ(Application C)=1 at this time, redundant configuration design means 12 selects application A for an additional pair.

Next, redundant configuration design means 12 assigns a redundant server for application C to a third physical server (physical server 3) to which an active server has been assigned for application A. Alternatively, a redundant server for application C may be assigned to a first physical server (physical server 1) or to a second physical server (physical server 2). Since λ(Application C)=0 at this time, redundant configuration design means 12 terminates the assignment of redundant servers to application C.

Next, redundant configuration design means 12 selects application B from the sorting result, and selects application A to form a pair with application B. Here, active servers for application A have been assigned to the first physical server and second physical server, and redundant configuration design means 12 finds the first physical server and second physical server which are free and therefore to which redundant servers can be assigned. Accordingly, redundant configuration design means 12 assigns redundant servers for application B to these first physical server and second physical server. Since λ(Application B)=0 at this time, redundant configuration design means 12 terminates the assignment of redundant servers to application B.

Finally, redundant configuration design means 12 selects application A from the sorting result, and selects application C to form a pair with application A. Here, an active server for application C has been assigned to a sixth physical server (physical server 6), and redundant configuration design means 12 finds a sixth physical server which is free and therefore to which a redundant server can be assigned. Accordingly, redundant configuration design means 12 assigns a redundant server for application A to the sixth physical server. Since λ(Application A)=0 at this time, redundant configuration design means 12 terminates the assignment of redundant servers to application A.

Through the foregoing process, redundant configuration design means 12 determines physical servers to which redundant virtual servers are assigned for all applications. Eventually, the virtual server placement information is provided as shown in FIG. 26.

Upon completion of the redundant configuration designing, a redundant configuration is constructed by virtual server management means 14 and virtual server control means 21 in accordance with the processing procedure shown in FIG. 6.

Referring next to the flow chart of FIG. 7, a description will be given of a degradation process when physical server 2 fails.

As shown in FIG. 7, graceful degradation determining means 13, upon receipt of information on a failed physical server through input means 11 (step 3000), must design a graceful degradation with remaining physical servers except for the failed server such that required availability requirements should be satisfied. Graceful degradation determining means 13 first determines whether or not a degradation process can provide a modified redundant configuration which satisfies the availability requirements (step 3001).

FIG. 27 shows exemplary information on a failed physical server. Consider here a scenario where a second physical server, a fifth physical server, and a sixth physical server have failed, as shown in FIG. 27.

Graceful degradation determining means 13 determines that degradation can be carried out because three physical servers have failed and "3" has been entered as the maximum allowable simultaneous fault as an availability requirement, as shown in FIG. 19.

Graceful degradation determining means 13 determines a graceful degradation which satisfies the number of virtual servers minimally required for processing each application (step 3002). In this example, two active servers are operating in support of application A, and one active server is operating in support of application B, while one active server is needed for executing application C in order to satisfy the minimum operating level.

Thus, Graceful degradation determining means 13 searches for a redundant server for application C, and detects redundant servers on a third physical server and a fourth physical server. Here, since the minimum operating level requirement is not violated even if one active server is taken from those active servers for application A, graceful degradation determining means 13 changes an active server for application A installed in third physical server 3 to a redundant server, and changes a redundant server for application C to an active server.

The foregoing degradation process results in satisfaction of the minimum operating level requirement for all applications. FIG. 28 shows exemplary graceful degradation information generated from graceful degradation determining means 13.

After designing of the graceful degradation, the redundant configuration is modified in accordance with the procedure shown in FIG. 8. In this example, an active server and a redundant server are interchanged by adjusting the amount of computer resources allocated to the virtual servers installed in the third physical server. The degradation process can be executed at high speeds since the adjustment of allocated computer resources is completed soon.

While the present invention has been described with reference to some exemplary embodiments, the present invention is not limited to the foregoing embodiments. The present invention can be modified in configuration and details in various manners which can be understood by those skilled in the art within the scope of the present invention.

The invention claimed is:

1. A redundant configuration management system comprising:
   input means that is used to enter an availability requirement for a computer system under management; and
   redundant configuration design means that determines placement of processing programs in physical servers equipped in said computer system to satisfy said availability requirement with reference to system configuration information including information on the configuration of said computer system, and restriction information for limiting the number of processing programs that can be run on said physical servers,
   wherein said availability requirement includes a maximum allowable simultaneous fault that refers to the number of failed physical servers which can be allowed within the overall computer system and a minimum operating level that indicates of a minimum number of processing programs which are required for services provided by each subsystem.

2. The redundant configuration management system according to claim 1, wherein said processing program is run to implement a virtual server.

3. The redundant configuration management system according to claim 2, further comprising:
   virtual server management means that generates a control request for managing said virtual servers installed in said physical servers based on redundant configuration information indicative of the placement of said virtual servers determined by said redundant configuration design means; and
   virtual server control means that controls the configuration of said virtual servers installed in said physical servers in response to the control request.

4. The redundant configuration management system according to claim 3, further comprising:
   graceful degradation determining means that determines a graceful degradation to satisfy the availability requirement, with reference to information on said failed physical server, the system configuration information, and the restriction information,
   wherein said virtual server management means generates a control request for managing said virtual servers installed on said physical servers based on the redundant configuration information and graceful degradation information indicative of the placement of said virtual servers determined by said graceful degradation determining means.

5. The redundant configuration management system according to claim 2, wherein said redundant configuration design means comprises:
   required server volume calculation means that calculates the number of said virtual servers required for accomplishing redundancy for said computer system to satisfy the availability requirement; and
   virtual server placement determining means that determines the placement of said virtual servers such that an active virtual server and a redundant virtual server associated with the same subsystem are not assigned to the same physical server.

6. The redundant configuration management system according to claim 2, wherein said redundant configuration design means comprises:
   maximum allowable simultaneous fault count calculation means, responsive to the occurrence of a failure in said physical server, that calculates a maximum allowable simultaneous fault indicative of the number of said virtual servers to allow said computer system to continuously operate, with reference to the availability requirement, the system configuration information, and the restriction information.

7. The redundant configuration management system according to claim 2, comprising:
   server volume conversion information storage having stored therein conversion information for converting a service level or a business requirement, entered as the availability requirement, to the number of virtual servers minimally required for the service level or the business requirement,
   wherein said redundant configuration design means includes minimum server volume calculation means that converts a service level or a business requirement entered as the availability requirement to the minimum number of virtual servers with reference to the conversion information stored in said server volume conversion information storage.

8. A redundant configuration management method comprising:
   receiving an availability requirement for a computer system under management; and
   determining placement of processing programs in physical servers equipped in said computer system to satisfy the availability requirement with reference to system configuration information including information on the configuration of said computer system, and restriction information for limiting the number of processing programs that can be run on said physical servers,
   wherein said availability requirement includes a maximum allowable simultaneous fault that refers to the number of failed physical servers which can be allowed within the overall computer system and a minimum operating level that indicates of a minimum number of processing programs which are required for services provided by each subsystem.

9. The redundant management method according to claim 8, wherein said processing program is run to implement a virtual server.

10. The redundant configuration management method according to claim 9, comprising:
    constructing a redundant configuration based on redundant configuration information indicative of the determined placement of said virtual servers, and managing said virtual servers installed in said physical servers.

11. The redundant configuration management method according to claim 10, comprising:
    upon receipt of information on said physical server which has failed, determining a graceful degradation to satisfy the availability requirement with reference to the information on said physical server, the system configuration information and the restriction information; and
    constructing the graceful degradation based on graceful degradation information indicative of the determined placement of said virtual servers.

12. The redundant configuration management method according to claim 9, comprising:

calculating the number of said virtual servers required for accomplishing redundancy of said computer system to satisfy the availability requirement; and determining the placement of said virtual servers such that an active virtual server and a redundant virtual server associated with the same subsystem are not assigned to the same physical server.

13. The virtual server redundant configuration management method according to claim 9, comprising:

upon occurrence of a failure in said physical server, calculating a maximum allowable simultaneous fault indicative of the number of said virtual servers to allow said computer system to continuously operate, with reference to the availability requirement, the system configuration information, and the restriction information.

14. The redundant configuration management method according to claim 9, comprising:

previously storing conversion information in a storage device for converting a service level or a business requirement entered as the availability requirement to the number of virtual servers minimally required for the service level or the business requirement; and upon receipt of a service level or a business requirement entered as the availability requirement, converting the service level or the business requirement to the minimum number of virtual servers with reference to the conversion information.

15. A redundant configuration management server comprising:

input means that is used to enter an availability requirement for a computer system under management, and information on a failed physical server;

redundant configuration design means that determines placement of said virtual servers for physical servers equipped in said computer system to satisfy the availability requirement with reference to system configuration information including information indicative of the configuration of said computer system, and restriction information for limiting the number of virtual servers that can be operated on said physical servers;

graceful degradation determining means that determines a graceful degradation to satisfy the availability requirement with reference to the information on said failed server, the system configuration information, and the restriction information; and virtual server management means for generating a control request that manages said virtual servers installed in said physical servers based on the redundant configuration information and graceful degradation information indicative of the placement of said virtual servers determined by said graceful degradation determining means, wherein said availability requirement includes a maximum allowable simultaneous fault that refers to the number of failed physical servers which can be allowed within the overall computer system and a minimum operating level that indicates of a minimum number of processing programs which are required for services provided by each subsystem.

\* \* \* \* \*